Oct. 13, 1964   G. L. JONES   3,152,486
BALL TYPE ERECTION MEANS
Filed Oct. 27, 1961

INVENTOR.
George Lester Jones
BY
Leonard S. Knox
Atty

United States Patent Office 3,152,486
Patented Oct. 13, 1964

3,152,486
BALL TYPE ERECTION MEANS
George Lester Jones, R.R. 2, Marne, Mich.
Filed Oct. 27, 1961, Ser. No. 148,128
9 Claims. (Cl. 74—5.43)

This invention relates to erecting means for gyroscopic instruments which depend for their function, at least in part, on a gyroscope providing a vertical reference axis. In instruments of this character the gyro rotor axis is subject to drift such as that due to friction, windage, eccentricity, etc. Accordingly the drift is compensated for by providing automatic means to maintain the gyro erect. In the case of an air-driven rotor various erecting expedients have been availed of which utilize air pressure available from the rotor housing or elsewhere in the form of reactive jets which, upon displacement of the reference axis from vertical, are controlled in a differential manner to restore the gyro casing, and hence the reference axis to normal. For example, pendulous shutters may be rendered cooperative with distributed ports through which air is bled from the casing and, by varying the effective area of the ports in a differential manner, the reactive force of the jets serves to return the gyro to its vertical reference position.

In my United States Patent No. 2,916,918, issued December 15, 1959, I disclose another type of organization utilizing reactive air jets varied in their restoring effect by shutters under the control of a sphere rolling on a fiducial surface.

It will be understood that where, herein, I refer to a gyroscope including an air-driven rotor spinning on a vertical axis and enclosed in a casing I am referring only to one form of structure to which the principles of the present invention are applicable, and in which the gimballing arrangement is capable of wide variation. Accordingly the support for the rotor casing or the part played by the gyroscope will not be elaborated upon. Furthermore, it will also be understood that the principles of the invention lend themselves to incorporation in many environments of which that shown and described herein is only exemplificative.

The principal object of the invention is to provide means responsive to departure of the vertical reference axis of the gyro from true vertical which is effective to restore the axis to vertical in a far more accurate and reliable manner and which is free of overshoot.

A further object is to provide erecting means which may be unitized, i.e. self-contained, for ease of assembly with a variety of gyro housings, and to facilitate servicing and replacement.

Another object is to provide such erecting means employing a comparatively small number of simple parts.

Other objects and advantages will appear from the ensuing description which, taken with the accompanying drawing, discloses a preferred mode of carrying the invention into practice.

Figure 1:
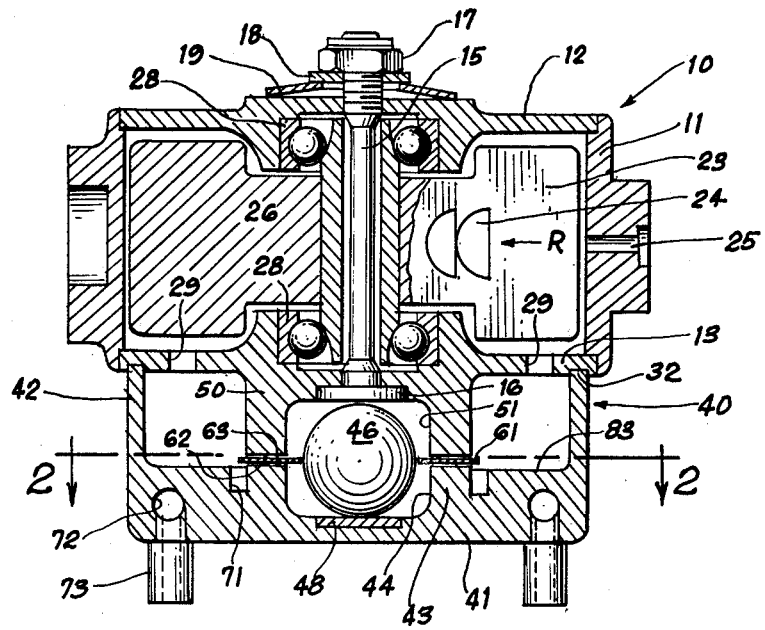
FIG. 1 is a vertical cross section through a typical gyro including its casing separated from the gimbal, together with the improved erecting means of the invention.
Figure 2:
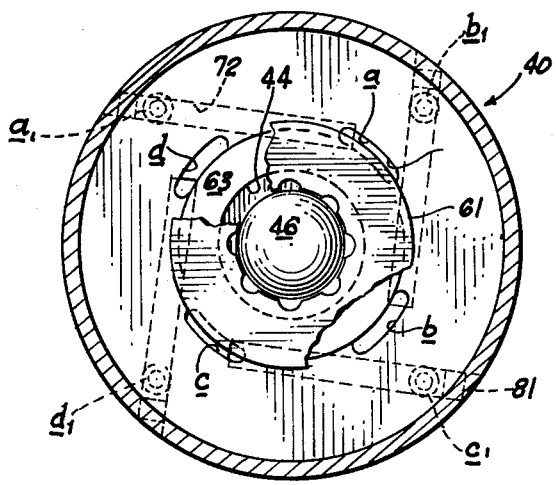
FIG. 2 is a cross section taken on the line 2—2 of FIG. 1.

Regarded in its broad aspect the invention is particularly adapted to an air-driven gyro and comprises a housing adapted to be secured to the lower end of the gyro casing. The housing is provided with a compartment having a fiducial floor portion which is horizontal when the gyro is erect and upon which a sphere may freely roll laterally in all directions under the influence of gravity as the reference axis departs from vertical. Thus the sphere represents, by its instantaneous position, the degree of departure of the axis from vertical. Another surface adjacent the top of the sphere prevents the same from shifting vertically under momentum imparted by pitching movement of the airplane.

An annular disc is received over the ball for floating movement in all lateral directions in a plane which may be regarded as an extension of the horizontal equatorial plane of the sphere or in a plane parallel thereto. The disc is guided with minimum clearance in a space defined by portions of the housing. One or more passages are provided between the rotor casing and the housing through which air under pressure is supplied to the latter, although air may be derived from another source and fed into the housing in any convenient manner. The housing is imperforate except for a plurality of outlet ports having entrances so arranged that the disc, in its lateral shifting movement, serves as an orbitally-shifting shutter to allow or to interrupt air flow through the ports in a differential manner whereby the volume of air exhausted therethrough may be correspondingly varied. Thus the reactive force of the several jets on the housing, viz. the rotor casing to which it is secured, is also differentially varied. The entrance ends of the ports are preferably elongated and arcuate and essentially of uniform width; and the same are equi-angularly spaced with the longitudinal axis thereof on a circle concentric with the equator of the sphere when the same is in its central or normal position, i.e. when the reference axis is vertical. The outside diameter of the disc is the same as the base circle of the port entrances. Thus, in said normal position of the sphere the disc will cover essentially one-half of each port entrance or what amounts to the same thing, all ports will pass an equal amount of air and their reactive forces will balance. However, upon displacement of the sphere the port entrances will be covered or uncovered by the disc in varying degrees whereby to provide such unbalance of the jets as will restore the axis to vertical, such coaction of the disc and port entrances being best referred to as "differential" in character. The relationship of the jets to the gyro gimbal is such that the resultant vector of reactive forces is positioned to precess the axis to vertical following displacement thereof. It will be understood that the corrective action is applied smoothly and continuously, that is to say departure once made evident is corrected virtually immediately and that, since the displacement allowed before corrective action is of extremely small order the problem of overshoot is of no appreciable consequence, or may be said to be non-existent.

In another aspect the invention comprehends nozzles as exits for the ports whereby the controlling action of the jets is availed of in the most efficacious manner and spurious reactions of the jets on other portions of the instrument are avoided.

Where, herein, I employ the term "differential" I intend to describe that coaction of the disc with the port entrances whereby the shifting of the disc will open and close the same in a graduated and selective manner such that opening or closing of one or more ports is always accompanied by proportional closing or opening of the remaining ports. Accordingly the reactive jets are influenced qualitatively and quantitatively to apply a net corrective torque of appropriate direction and magnitude. Stated otherwise the adjective "differential" or the adverb "differentially" refer to the difference in the effects of the jets rather than the absolute value of the volume of air flow from any one port.

Turning now to the drawing, I have shown a casing 10 including an annular wall 11, an upper end wall 12 and a lower end wall 13. These may be assembled in any convenient manner, e.g. by a bolt 15 having an extended head 16 (having an additional function to appear), a nut 17, a plain washer 18 and a dished, tensioning washer 19 whereby the end walls 12 and 13 may be reliably held and the anti-friction bearings of the rotor, preloaded. The rotor 23 is conventional, including buckets or pockets 24 for impingement by the air stream which enters at 25. Rotatable support is provided by a hollow hub 26 formed at its ends for bearing on the balls of two bearings 28 mounted in the associated end plates 12 and 13. Exhaust from the casing 10 is via one or more openings 29 in the end plate 13.

The erecting mechanism of the invention is desirably self-contained and comprises a circular housing 40 including a bottom wall 41 and a circular side wall 42. The housing 40 is accurately positioned coaxially with the gyro rotor axis by means of a groove 32 in the end wall 13, and is secured to the gyro casing by screws (not shown) passing through bores in the housing. The housing 40 is provided with an annular, interior wall 43 defining a pocket 44 receiving an accurately formed metal sphere 46 adapted to roll freely, except as frictionally restrained by the annular shutter coactive therewith, over some predetermined area upon a hardened insert 48 constituting a flat, fiducial surface, it being understood that the housing 40 will, in practice, comprise light weight material which is soft compared with that of the sphere. It will be understood that when the reference axis, e.g. the rotor axis of the example, is vertical the surface of the insert 48 will be horizontal.

An annular wall 50 depends from the end plate 13 to define a pocket 51 desirably coextensive with the pocket 44 and within which two pockets the sphere is contained against lateral overtravel. Suitable vertical restraint is applied to the sphere by the head 16 of the bolt 15 or equivalent. Clearance afforded for the sphere need only be such as to confine the same against jolting upon maneuvering of the aircraft, or other vehicle, but still permit free lateral rolling of the same. If desired the wall 50 may be formed as a part of the housing 40 whereby the erecting assembly may be fabricated and adjusted as a unit prior to incorporation with the gyroscope.

Figure 3:
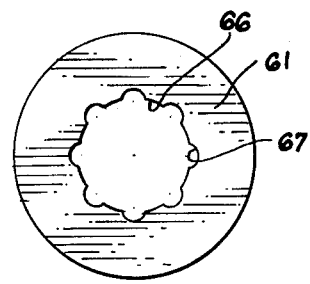
FIG. 3 is a detail of the shutter cooperating commonly with the ports through which air is exhausted to provide the reactive jets.

An annular disc or shutter 61 (FIG. 3) is positioned over the sphere, desirably co-planar with the equatorial plane of the sphere and is made sufficiently thin for minimum weight, i.e. inertia, compatible with retention of flatness. The disc is guided for lateral shifting movement between the opposite annular faces 62 and 63 of the walls 50 and 43 respectively. The clearance provided for free lateral movement of the disc is a minimum. Moreover all confronting surfaces, e.g. the walls 62 and 63 and those of the disc are rendered as smooth as possible to minimize sliding friction and to avoid the need of lubrication which might otherwise introduce drag and consequent lag in the movement of the disc. It will also be noted that the opening 66 of the disc has minimum clearance with the sphere in order that the disc may rapidly follow the excursions of the sphere.

In every case where clearances are shown on the drawing the same have been exaggerated for clarity of comprehension.

Preferably the periphery of the opening 66 of the disc is interrupted at intervals, as by one or more notches 67 to avoid the possible adverse effects of drag due to vacuum on either face of the disc by virtue of the pockets 44 and 51, it being recalled that the clearance between the sphere and disc and between the disc and the surfaces 62 and 63 is a minimum.

In FIG. 1 the disc 61 is indicated as spaced above the entrances 71 of a plurality of ports to be described. Such showing is exaggerated since, in practice, the disc is arranged to slide on the margin of the entrances, in the present case the surface 83 of the end wall 41, with only such minimum clearance as will avoid drag.

A plurality of ports, in this case four in number, equiangularly spaced apart on a common base circle, are provided in the bottom wall 41 of the housing 40. Each port includes an entrance 71, a connecting passage 72 and an exit 73. It will be observed that the entrance and exit are displaced 90° for a purpose to appear.

Each entrance 71 is preferably of elongated arcuate form with the longitudinal axis thereof lying on a base circle of the same diameter as the outer diameter of the disc 61. Regarding this diameter as several times greater than the transverse width of the slot the area of an entrance 71 is essentially bisected by the disc 61 when this latter is in its normal position, i.e. the polar axis of the sphere is coaxial with the reference axis. Accordingly the area of the entrances 71 exposed by the disc in the normal position of the sphere is the same for all and the reactive jets are in equilibrium. Upon departure of the axis from vertical the sphere will roll in a direction corresponding to such displacement and will carry the disc 61 with it. For example, referring to FIG. 1, assuming that the axis tilts so that its upper end moves to the left in the plane of the paper, the sphere will roll to the left and the disc will uncover more of the entrances $a$ and $b$ and will cover more of the entrances $c$ and $d$. Thus the jets issuing at $a_1$ and $b_1$ will overcome those inssuing at $c_1$ and $d_1$ and the net reactive force will be represented by a resultant vector applied essentially on a line joining $a_1$ and $b_1$. Assuming rotation of the rotor in the direction of the arrow R (FIG. 1) such net force will amount to a corrective torque applied 90° away from the plane of displacement of the axis thereby precessing the casing in the direction necessary to restore the axis to vertical.

From the foregoing it will be evident that tilting of the axis in any direction will yield similar erecting action, the entrances $a$, $b$, $c$ and $d$ being opened or closed in a differential manner to provide a net reactive force of suitable magnitude and direction.

The passages 72 are obtained in any conventional manner, e.g. by drilling from the perimeter of the wall 42 and then inserting plugs 81.

By providing nozzles 73 as the termination of each port exit the air jets are restricted to a narrow cross section and issue perpendicularly to the housing thereby providing a force vector having its principal direction displaced 90° from the vector representing the direction of tilt of the axis, with optimum utilization of the energy of the jets. This advantage may be contrasted with the use of a simple exhaust opening whereby the issuing air may, immediately upon exit, fan out and have its force dissipated over a substantial area having little or not true relation to the wanted corrective vector. Moreover, by the instant arrangement the issuing jets are brought closer to the openings in the wall of the hollow sphere usually employed to case the gyro. Thus the jet reaction is essentially outside the sphere whereby the possibility of misfunction due to burbling action within such casing sphere is avoided.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. Erecting means for a gyroscopic element adapted to function as a vertical reference axis but subject to displacement of said axis, comprising: an essentially closed housing secured to the element, means defining a passage for flow of air from a suitable source into said housing, a sphere, said housing having portions defining a pocket to receive said sphere, said pocket being sufficiently larger laterally than said sphere for free lateral rolling movement of said sphere therein over a predetermined area upon displacement of the axis, the pocket having a horizontal fiducial surface upon which the sphere rolls, a plurality of ports in the housing through which air may escape therefrom, said ports being angularly equidistantly spaced about the polar axis of the sphere when the same is in normal position, the exit of each port being displaced angularly 90° from its entrance and an annular shutter positioned over the sphere with running clearance therebetween for translational lateral movement of the shutter by excursion of the sphere, said shutter being adapted to obturate the entrances of the ports selectively and variably in a differential manner to vary the energy of the escaping air differentially in accordance with the instantaneous position of the sphere.

2. The combination in accordance with claim 1 further characterized by the provision on the inside periphery of the shutter of a notch to break vacuum between the sphere and pocket.

3. The combination in accordance with claim 1 wherein the entrances to said ports have an elongated, arcuate transverse cross section, the longitudinal axes whereof lie on a base circle of substantially the same diameter as the outer diameter of said disc.

4. Erecting means for a gyroscopic element adapted to function as a vertical reference axis but subject to displacement of said axis, comprising: an essentially closed housing secured to the casing, means defining a passage for flow of air from a suitable source into said housing, a sphere carried in said housing for free rolling, lateral movement therein over a predetermined area upon displacement of the axis, means for defining the maximum extent of said movement, means for restraining vertical displacement of said sphere, an annulus engaged over said sphere with running clearance therebetween to be displaced correspondingly laterally thereby upon movement thereof, means for guiding said annulus for such movement, a plurality of ports spaced apart about the polar axis of the sphere regarded in its normal position, said ports providing air flow from the interior of said housing to the exterior thereof in the form of jets, said annulus being adapted to obturate the entrance ends of the ports selectively and variably in a differential manner in correspondence with the instantaneous position of the annulus to vary the velocity of the several jets issuing from the respective exit ends of the ports, the exit end of each port being displaced 90° angularly from the entrance end thereof in a clockwise or counterclockwise direction depending upon the direction of rotation of the gyro rotor in order that the corrective, precessive effect of the jets is applied in a direction to erect the gyroscopic element.

5. The combination in accordance with claim 4 wherein said port entrances are arcuate slots having a longitudinal axis coincident with the outer periphery of said annulus and a width substantially equal to the maximum excursion of the annulus.

6. The combination in accordance with claim 5 further characterized by the provision of a tube forming the exit end of each port to direct the jets essentially perpendicularly to the plane of excursion of the sphere.

7. The combination in accordance with claim 4 further characterized in that the inner periphery of the annulus is notched to break vacuum between the sphere and its movement-defining means.

8. Erecting means for a gyroscopic element adapted to function as a vertical reference axis but subject to displacement of said axis comprising: an essentially closed housing mounted on said element, a source of supply of air under pressure, an opening through the wall of said housing for admission of air thereinto from said source, a horizontal fiducial surface in said housing, a sphere carried in said housing on said surface for free rolling lateral movement in all directions in response to departure of the element from its normal reference position, means in said housing confining said sphere to movement in lateral directions only, a horizontal annulus having its opening engaged over said sphere with running clearance for orbital shifting movement laterally corresponding to the lateral excursions of the sphere, a plurality of passages through said housing wall providing exhaust of air therefrom, said passages each having an entrance end positioned to be obturated variably and selectively by said annulus to control flow of air therethrough in a differential manner upon shifting of said annulus, said entrances having equal cross-sectional area and being spaced apart on a circular base line concentric with the equator of the sphere when in normal position, the perimeter of the annulus being selected to allow equal flow through all passages when the gyroscopic element is erect, and each passage having an exit end directing the exhausting air jets therethrough essentially vertically, said exit ends being equal and spaced apart on a base circle concentric with the equator of the sphere when in normal position, the exit end of each passage being displaced angularly 90° from its respective entrance end.

9. The combination in accordance with claim 8 further characterized in that the said exit ends are each a nozzle having its longitudinal axis parallel to the polar axis of the sphere when in its normal position.

References Cited in the file of this patent

UNITED STATES PATENTS 2,916,918     Jones _____ Dec. 15, 1959

FOREIGN PATENTS 118,552     Sweden _____ Apr. 8, 1947